United States Patent [19]

Newkirk et al.

[11] Patent Number: 5,064,788
[45] Date of Patent: * Nov. 12, 1991

[54] PRODUCTION OF CERAMIC AND CERAMIC-METAL COMPOSITE ARTICLES WITH SURFACE COATINGS

[75] Inventors: Marc S. Newkirk, Newark, Del.; Adam J. Gesing, Kingston, Ontario, Canada

[73] Assignee: Lanxide Technology Company, LP, Newark, Del.

[*] Notice: The portion of the term of this patent subsequent to Dec. 15, 2004 has been disclaimed.

[21] Appl. No.: 449,526

[22] Filed: Dec. 12, 1989

Related U.S. Application Data

[63] Continuation of Ser. No. 908,124, Sep. 16, 1986, Pat. No. 4,948,764.

[51] Int. Cl.$^5$ ............................................. C04B 35/00
[52] U.S. Cl. ...................................... 501/92; 501/97; 501/127; 427/250; 427/255; 264/60; 264/62
[58] Field of Search .................... 501/92, 97, 127; 427/255, 250; 264/60, 62

[56] References Cited

U.S. PATENT DOCUMENTS

| | | | |
|---|---|---|---|
| 2,741,822 | 4/1956 | Udy | 264/650 R |
| 3,031,340 | 4/1962 | Girardot | 264/60 |
| 3,255,027 | 6/1966 | Talsma | 501/850 R |
| 3,296,002 | 1/1967 | Hare | 501/80 OR |
| 3,298,842 | 1/1967 | Seufert | 581/800 R |
| 3,419,404 | 12/1968 | Mao | 501/98 OR |
| 3,421,863 | 1/1969 | Bawa | 75/234 R |
| 3,437,468 | 4/1969 | Seufert | 75/235 OR |
| 3,473,938 | 10/1969 | Oberlin | 501/107 OR |
| 3,473,987 | 10/1969 | Sowards | 156/89 OR |
| 3,538,231 | 11/1970 | Newkirk et al. | 13/25 |
| 3,608,170 | 9/1971 | Larson | 264/60 |
| 3,770,488 | 11/1973 | Pepper et al. | 427/299 OR |
| 3,789,096 | 1/1974 | Church | 264/600 R |
| 3,864,154 | 0/1974 | Gazza et al. | 264/60 |
| 3,868,267 | 2/1975 | Gazza et al. | 264/60 X |
| 3,922,474 | 11/1975 | Brown | 427/255 |
| 3,963,839 | 6/1976 | Freller | 427/255 |
| 3,969,553 | 7/1976 | Kondo et al. | 264/636 |
| 3,973,977 | 8/1976 | Wilson | 501/120 OR |
| 4,713,360 | 12/1987 | Newkirk et al. | 501/134 X |
| 4,774,103 | 9/1988 | Kamigaito et al. | 427/38 |
| 4,818,635 | 4/1989 | Ekström et al. | 501/92 X |
| 4,832,888 | 5/1989 | Sato et al. | 501/92 X |
| 4,843,040 | 6/1989 | Oda et al. | 501/92 |
| 4,948,764 | 8/1990 | Newkirk et al. | 501/127 |

FOREIGN PATENT DOCUMENTS

| | | |
|---|---|---|
| 0116809 | 8/1984 | European Pat. Off. |
| 0155831 | 9/1985 | European Pat. Off. |
| 0169067 | 1/1986 | European Pat. Off. |

OTHER PUBLICATIONS

"Oxidation of Molten Aluminum Alloys. Reaction with Refractories"-M. Drouzy and M. Richard—Mar., 1974-Fonderie, France No. 332, pp. 121-128.
"Refractories for Aluminum Alloy Melting Furnaces'-'—B. Clavaud and V. Jost—Sep., 1980—Lillian Brassinga (from French) Jan., 1985.

Primary Examiner—Karl L. Group
Attorney, Agent, or Firm—Mark G. Mortenson; Michael K. Boyer

[57] ABSTRACT

The invention comprises a method of making self-supporting ceramic and ceramic composite structures by the oxidation reaction of a body of molten parent metal precursor with a vapor-phase oxidant to form an oxidation reaction product. This reaction or growth is continued to form a thick, self-supporting ceramic or ceramic composite body. The body is recovered and in a separate subsequent operation, at least a portion of a surface is coated with one or more materials in order to effect desired changes in the properties of the surface, e.g., hardness, corrosion resistance.

8 Claims, No Drawings

PRODUCTION OF CERAMIC AND CERAMIC-METAL COMPOSITE ARTICLES WITH SURFACE COATINGS

This is a continuation of copending application Ser. No. 06/908,124 filed on 9/16/86, which is now U.S. Pat. No. 4,948,764.

The present invention relates to novel ceramic structures and to novel methods of making the same. In particular, the invention relates to ceramic and ceramic-composite structures having a surface coating which effects desired changes to the surface properties.

BACKGROUND OF THE INVENTION AND COMMONLY OWNED PATENT AND PATENT APPLICATIONS

In recent years, there has been an increasing interest in the use of ceramics for structural applications historically served by metals. The impetus for this interest has been the superiority of ceramics with respect to certain properties, such as corrosion resistance, hardness, modulus of elasticity, and refractory capabilities, when compared with metals.

Current efforts at producing higher strength, more reliable, and tougher ceramic articles are largely focused upon (1) the development of improved processing methods for monolithic ceramics and (2) the development of new material compositions, notably ceramic matrix composites. A composite structure is one which comprises a heterogeneous material, body or article made of two or more different materials which are intimately combined in order to attain desired properties of the composite. For example, two different materials may be intimately combined by embedding one in a matrix of the other. A ceramic matrix composite structure typically comprises a ceramic matrix which incorporates one or more diverse kinds of filler materials such as particulates, fibers, rods, and the like.

There are several known limitations or difficulties in substituting ceramics for metals, such as scaling versatility, capability to produce complex shapes, satisfying the properties required for the end use application, and costs. Several copending patent applications assigned to the same owner as this application (hereinafter referred to as commonly owned patents and patent applications), overcome these limitations or difficulties and provide novel methods for reliably producing ceramic materials, including composites. The method is disclosed generically in Commonly Owned U.S. Pat. No. 4,713,360 which issued on Dec. 15, 1987 and was based on U.S. application Ser. No. 818,943, filed Jan. 15, 1986, which is a continuation-in-part of Ser. No. 776,964, filed Sept. 17, 1985, now abandoned which is a continuation-in-part of Ser. No. 705,787, filed Feb. 26, 1985, now abandoned which is a continuation-in-part of U.S. application Ser. No. 591,392, filed Mar. 16, 1984, now abandoned all in the names of Marc S. Newkirk et al and entitled "Novel Ceramic Materials and Methods of Making the Same". U.S. Pat. No. 4,713,360 discloses a method of producing self-supporting ceramic bodies grown as the oxidation reaction product from a parent metal precursor. Molten metal is reacted with a vapor-phase oxidant to form an oxidation reaction product, and the metal migrates through the oxidation product toward the oxidant thereby continuously developing a ceramic polycrystalline body which can be produced having an interconnected metallic component. The process may be enhanced by the use of an alloyed dopant, such as is used in the case of oxidizing aluminum doped with magnesium and silicon for oxidation reaction in air to form alpha-alumina ceramic structures. This method was improved upon by the application of dopant materials to the surface of the precursor metal, as described in Commonly Owned U.S. Pat. No. 4,853,352, which was issued on Aug. 1, 1989 and was based on U.S. patent application Ser. No. 822,999, filed Jan. 27, 1986, now abandoned which is a continuation-in-part of Ser. No. 776,965, filed Sept. 17, 1985, now abandoned which is a continuation-in-part of Ser. No. 747,788, filed June 25, 1985, now abandoned which is a continuation-in-part of Ser. No. 632,636, filed July 20, 1984, now abandoned all in the names of Marc S. Newkirk et al and entitled "Methods of Making Self-Supporting Ceramic Materials".

This oxidation phenomenon was utilized in producing ceramic composite bodies as described in commonly owned U.S. Pat. No. 4,851,375, which was issued on July 25, 1989 and was based on U.S. patent application Ser. No. 819,397, filed Jan. 17, 1986, which is a continuation-in-part of Ser. No. 697,876, filed Feb. 4, 1985, now abandoned both in the name of Marc S. Newkirk et al and entitled "Composite Ceramic Articles and Methods of Making Same". U.S. Pat. No. 4,851,375 disclose novel methods for producing a self-supporting ceramic composite by growing an oxidation reaction product from a metal precursor into a permeable mass of filler, thereby infiltrating the filler with a ceramic matrix. The resulting composite, however, has no defined or predetermined geometry, shape, or configuration.

A method for producing ceramic composite bodies having a predetermined geometry or shape is disclosed in the Commonly Owned and copending U.S. patent application Ser. No. 861,025, filed May 8, 1986, now abandoned. In accordance with the method in this U.S. patent application, the developing oxidation reaction product infiltrates a permeable preform in the direction towards a defined surface boundary. It was discovered that high fidelity is more readily achieved by providing the preform with a barrier means, as disclosed in commonly owned U.S. patent application Ser. No. 861,024, filed May 8, 1986, now U.S. Pat. No. 4,923,832. This method produces shaped self-supporting ceramic bodies, including shaped ceramic composites, by growing the oxidation reaction product of a metal precursor to a barrier means spaced from the metal for establishing a boundary or surface. Ceramic composites having a cavity with an interior geometry inversely replicating the shape of a positive mold or pattern is disclosed in Commonly Owned U.S. patent application Ser. No. 823,542, filed Jan. 27, 1986, which was issued on May 9, 1989 as U.S. Pat. No. 4,828,785 and in U.S. patent application Ser. No. 896,157, filed Aug. 13, 1986 which was issued on Aug. 22, 1989 as U.S. Pat. No. 4,859,640.

The aforementioned commonly owned patents and patent applications disclose methods for producing ceramic articles which overcome some of the traditional limitations or difficulties in producing ceramic articles as substitutes for metals in end-use applications.

Common to each of these commonly owned patents and patent applications is the disclosure of embodiments of a ceramic body comprising an oxidation reaction product interconnected in one or more dimensions (usually in three dimensions) and one or more metallic constituents or components. The volume of metal, which typically includes non-oxidized constituents of the parent metal and/or metal reduced from an oxidant or filler, depends on such factors as the temperature at which the oxidation reaction product is formed, the length of time at which the oxidation reaction is allowed to proceed, the composition of the parent metal, the presence of dopant materials, the presence of reduced constituents of any oxidant or filler materials, etc. Although some of the metallic components may be isolated or enclosed, it is frequently the case that a substantial volume percent of metal will be interconnected and accessible from an external surface of the ceramic body. It has been observed for these ceramic bodies that this interconnected metal-containing component or constituent can range from about 1 to about 40 percent by volume, and sometimes higher. Such a metallic component can impart certain favorable properties to, or improve the performance of, the ceramic articles in many product applications. For example, the presence of metal in the ceramic structure may have a substantial benefit with respect to imparting fracture toughness, thermal conductivity, resilience or electrical conductivity to the ceramic body.

U.S. application Ser. No. 896,481 discloses a further modification of the processes disclosed in the commonly owned patents and patent applications, for modifying the metallic constituents present in the aforementioned ceramic and ceramic composite bodies. In a post-treatment process, the unoxidized parent metal which is comprised within the body is displaced with one or more foreign metals, chosen so as to effect desired improvements in the properties of the end product. In a preferred embodiment, displacement is effected by immersing the body in a molten pool of the foreign metal where this foreign metal has a higher melting point than the displaced parent metal.

The entire disclosures of all of the foregoing commonly owned patents and patent applications are expressly incorporated herein by reference.

The present invention discloses a method for producing self-supporting polycrystalline ceramic structures whereby molten parent metal reacts with a vapor-phase oxidant to form an oxidation reaction product which grows progressively so as to form a polycrystalline ceramic structure, optionally embedding a permeable mass of filler. The structure so produced is coated with one or more materials which effect desired changes to the surface properties of the final product.

DEFINITIONS

As used hereinafter in the specification and the appended claims, the terms below are defined as follows:

"Ceramic" is not to be unduly construed as being limited to a ceramic body in the classical sense, that is, in the sense that it consists entirely of non-metallic and inorganic materials, but rather refers to a body which is predominantly ceramic with respect to either composition or dominant properties, although the body contains minor or substantial amounts of one or more metallic constituents, most typically within a range of from about 1–40% by volume, but may include still more metal.

"Oxidation reaction product" means one or more metals in any oxidized state wherein the metal(s) has given up electrons to or shared electrons with another element, compound, or combination thereof. Accordingly, an "oxidation reaction product" under this definition includes the product of reaction of one or more metals with an oxidant such as oxygen, nitrogen, a halogen, sulphur, phosphorus, arsenic, carbon, boron, selenium, tellurium, and compounds and combinations thereof, for example, methane, oxygen, ethane, propane, acetylene, ethylene, propylene (the hydrocarbon as a source of carbon), and mixtures such as air, $H_2/H_2O$ and $CO/CO_2$, the latter two (i.e., $H_2/H_2O$ and $CO/CO_2$) being useful in reducing the oxygen activity of the environment.

"Vapor-phase oxidant", which identifies the oxidant as containing or comprising a particular gas or vapor, means an oxidant in which the identified gas or vapor is the sole, predominant or at least a significant oxidizer of the parent metal under the conditions obtained in the oxidizing environment utilized. For example, although the major constituent of air is nitrogen, the oxygen content of air is the sole oxidizer for the metal precursor because oxygen is a significantly stronger oxidant than nitrogen. Air therefore falls within the definition of an "oxygen-containing gas" oxidant but not within the definition of a "nitrogen-containing gas" oxidant as those terms are used herein and in the claims. An example of a "nitrogen-containing gas" oxidant is "forming gas", which typically contains about 96 volume percent nitrogen and about 4 volume percent hydrogen.

"Parent metal" refers to the metal which reacts with the vapor-phase oxidant to form the polycrystalline oxidation reaction product, and includes that metal as a relatively pure metal or a commercially available metal with impurities; and when a specified metal is mentioned as the parent metal, e.g. aluminum, the metal identified should be read with this definition in mind unless indicated otherwise by the context.

"Coating" is not to be construed as being limited to a discrete layer on a substrate which takes no part in the formation of said layer. Rather the term refers also to "diffusion coating" in which the substrate takes part in the formation of the coating, e.g. by chemical reaction with one or more coating materials. Examples of such diffusion coating processes include aluminising, boridising, nitriding, carburising, chromising, etc.

"Chemical vapor deposition" (CVD) is a process which uses a vapor phase to transport reactive material to the surface of a substrate, wherein a chemical reaction occurs to form the coating. Normally the substrate is heated to activate the reaction, and as stated hereinabove the substrate may or may not take part in the formation of the coating.

"Physical vapor deposition" (PVD) processes use a physical effect such as evaporation or sputtering to transport material, usually a metal, from a source to the substrate to be coated. Examples of physical vapor deposition processes are:

Evaporation: The substrate to be coated is placed in a vacuum chamber with a line-of-sight to the source which is a pool of molten metal. The pool is heated either by an electron beam or by resistance heating.

Ion Plating is the same process as evaporation except that the substrate is biassed negatively with respect to the source. This usually results in a plasma region around the substrate.

Sputter Plating is a process in which material is transferred from a target and deposited on a substrate by means of ionic bombardment of the target.

SUMMARY OF THE INVENTION

The invention comprises a method of making self-supporting ceramic structures by the oxidation reaction of a body of molten parent metal with a vapor-phase oxidant to form an oxidation reaction product. Molten metal is drawn through the oxidation reaction product towards the oxidant to cause continued growth of the product at the interface between oxidant and previously formed product. This reaction or growth is continued to form a thick, self-supporting ceramic body. The resulting ceramic material of the polycrystalline growth product consists essentially of an oxidation reaction product and, optionally, one or more non-oxidized constituents of the parent metal.

Optionally a permeable mass of filler is positioned adjacent to the parent metal body, so that the oxidation reaction product grows into the filler which becomes embedded in the polycrystalline oxidation growth product. Optionally, one or more dopants may be provided in the parent metal to aid the oxidation reaction. The self-supporting ceramic body is recovered and in a separate subsequent operation, the surface is coated with one or more materials in order to effect desired changes in the properties of the surface, e.g. hardness, corrosion resistance. The coating operation may comprise chemical vapor deposition or physical vapor deposition of the desired material using one or more surfaces of the body as a substrate.

In a further aspect of the invention, the recovered body comprises interconnected metal, in addition to the interconnected ceramic matrix. Prior to the aforesaid coating operation, the parent metal comprising the matrix is displaced by a foreign metal. The body now with the foreign metal as a primary constituent of the interconnected metal, is exposed to conditions in which the foreign metal at the surface is selectively diffusion-coated with one or more elements. These elements are chosen for their ability to effect desired changes in the properties of the exposed surface of the foreign metal.

DETAILED DESCRIPTION OF THE INVENTION

The invention comprises a method of making self-supporting ceramic structures by the oxidation reaction of a body of molten parent metal with a vapor-phase oxidant to form an oxidation reaction product. Molten metal is drawn through the oxidation reaction product towards the oxidant to cause continued growth of the product at the interface between the oxidant and previously formed product.

In a preferred embodiment, a permeable mass of filler is positioned adjacent to the parent metal body so that the oxidation reaction product grows into the filler which becomes embedded in the polycrystalline oxidation growth product. The filler may comprise a bed of unbonded inert particles. Alternatively, the filler particles may be bonded together to form a rigid preform which preferably has the size and shape of the required end product.

Optionally, one or more dopants may be provided in the parent metal, on its surface, or dispersed into or coated onto the filler to aid the oxidation reaction.

Optionally, a barrier material may be provided as a layer defining a surface of said filler, the material being chosen to inhibit further oxidation of the parent metal or infiltration by its reaction product beyond the barrier layer. The barrier layer provides a means, therefore, of defining the outside surface of the required ceramic composite product.

Optionally, unoxidized parent metal is allowed to remain as a continuous network in the ceramic or ceramic composite product, i.e. as interconnected metal.

Optionally, one or more alloying additions may be made to the parent metal to impart a desired improvement in properties thereof, e.g. mechanical properties, or electrical or thermal conductivities.

All the foregoing methods have been disclosed in the aforesaid Commonly Owned Patent Applications.

The improvement of the present invention resides in a method of providing a coating on one or more surfaces of the ceramic or ceramic composite product to impart one or more desired improvements to the properties of the surface. For instance, it may be desired to improve the surface hardness or resistance to abrasion. Alternatively, it may be desired to improve resistance of the surface to attack by corrosive media.

As a result, the properties of the surface of the ceramic or ceramic composite product differ from the properties of the interior. For example, the interior may comprise material having generally desirable properties for the intended application, but lacking resistance to abrasion. Provision of an appropriate surface coating can increase surface hardness and abrasion resistance. Thus, a desirable combination of properties can be obtained.

The coating may comprise a discrete layer on the surface of the ceramic or ceramic composite body, the surface comprising a substrate which takes no part in the formation of said layer. Alternatively, the substrate may take part in the formation of the coating, e.g. by chemical reaction with one or more coating materials, as the materials or the reaction products with the substrate diffuse into the substrate. Where the self-supporting body comprises interconnected metal, the reaction to form the coating may take place selectively with the exposed surfaces of the metal.

The coating may optionally be a diffusion coating in which the coating material reacts with the interconnected metal substrate at the surface of the self-supporting body and diffuses inwardly to thicken the coating. As a result, the properties at the surface of the self-supporting body differ from those of the interior of the self-supporting body. For example, the interior of the self-supporting body may comprise tough, ductile metal which is lacking in resistance to abrasion. Provision of a coating according to the present invention on the surface of the exposed metal will provide a layer of hard, abrasion-resistant material. Thus, a desirable combination of properties of the metal and hence of the body as a whole is obtained.

Various methods may be used to deposit the coatings on the surface of the ceramic and ceramic articles. These methods are well known per se; the invention comprises the combination of such methods with the novel methods of making the aforesaid polycrystalline ceramic and ceramic structures embodied in the Commonly Owned Patent Applications.

Thus, chemical vapor deposition (CVD) processes may be used to deposit the coating. The coating deposited in this way may comprise one or more elements selected from aluminum, boron, carbon, cobalt, chromium, germanium, hafnium, molybdenum, nickel, niobium, palladium, silicon, silver, tin, tantalum, titanium, vanadium, tungsten or zirconium. For example, it may be desired to deposit a boron coating on the surface of the self-supporting body. This may be done by heating the body in a vapor phase comprising a volatile boron compound such as boron hydride, $B_2H_6$, at a temperature of 400°–700° C. Alternatively, the atmosphere may comprise a mixture of boron trichloride, $BCl_3$, and hydrogen and the required temperature would then be 1000°-1500° C. The coating deposited by either of the aforesaid exemplary methods may simply comprise elemental boron. However, if a body in which the metal is, for example, aluminum, has boron deposited on the surface thereof from, for example, a boron hydride precursor, at a temperature below the 660° C. approximate melting point of aluminum, the boron reacts selectively with the surface layer of the aluminum matrix to form an aluminum boride. This provides a hard surface on said matrix, combined with a tough ductile metal network in the interior of the body, this being a very desirable combination of properties.

Alternatively, one or more of said elements may be deposited on the surface of the body by a physical vapor deposition process. For example, silver, aluminum, copper, molybdenum, niobium, nickel, platinum, silicon, tantalum, titanium, and tungsten are examples of metallic elements which can be deposited on a substrate by one or more sputtering processes.

Various compounds can be deposited on one or more surfaces of the body according to the method of the invention. Thus, carbides of boron, chromium, hafnium, molybdenum, niobium, silicon, tantalum, titanium, vanadium, tungsten, and zirconium can be deposited by chemical vapor deposition processes. For example, boron carbide, $B_4C$, can be deposited on the one or more surfaces of the body by heating the body to a temperature of 1200°-1900° C. in an atmosphere comprised of a mixture of boron trichloride vapor, $BCl_3$, with various carbon-containing gases such as carbon monoxide or various organic gases such as methane, together with hydrogen. Boron carbide provides a hard, wear-resistant coating material.

Alternatively, one or more of said carbides may be deposited on the surface of the body by a physical vapor deposition process. For example, carbides of chromium, molybdenum, silicon, tantalum, titanium and tungsten can be deposited by reactive sputtering in which a plasma is established locally at the surface on which deposition is to be effected and a reactive gas together with appropriate target material is transported into the plasma. Carbide is formed by reaction of the gas with the target material prior to deposition on the substrate.

Nitrides of aluminum, boron, hafnium, niobium, tantalum, silicon, titanium, tungsten or zirconium can be deposited by chemical vapor deposition processes. For example, boron nitride, BN, can be deposited on one or more surfaces of the body by heating the body to a temperature of 1000°-2000° C. in an atmosphere comprised of a mixture of boron trichloride or trifluoride and ammonia.

Boron nitride provides a hard, wear-resistant coating material.

Alternatively, one or more of said nitrides may be deposited on the surface of the body by a physical vapor deposition process. For example, nitrides of aluminum, hafnium, niobium, tantalum, titanium, and tungsten can be deposited by the reactive sputtering process referred to hereinabove.

Oxides of aluminum, chromium, silicon, tantalum, tin, titanium, zinc, and zirconium can be deposited by chemical vapor deposition processes. For example, zirconium oxide, $ZrO_2$, can be deposited on one or more surfaces of the body by heating at a temperature of about 1000° C. in an atmosphere comprised of a mixture of zirconium tetrachloride vapor, $ZrCl_4$, carbon dioxide, carbon monoxide, and hydrogen. Zirconium oxide provides a hard wear- and oxidation-resistant surface coating.

Alternatively, one or more of said oxides may be deposited by a physical vapor deposition process. For example, zirconium oxide can be deposited by a sputtering process.

A further embodiment of the invention comprises a method of producing self-supporting ceramic bodies having a modified metal-containing component including first providing according to the methods disclosed in the aforesaid Commonly Owned Patent Applications a self-supporting ceramic body comprising (i) a polycrystalline oxidation reaction product formed upon oxidation of a molten parent metal precursor with an oxidant, and (ii) an interconnected metal-containing component at least partially accessible from one or more surfaces of said ceramic body. The surface or surfaces of the ceramic body is contacted with a quantity of foreign metal different from said interconnected metal-containing component at a temperature and for a time sufficient to allow for interdiffusion, whereby at least a portion of said metal-containing component is displaced by said foreign metal. The resulting ceramic body, having an altered metal-containing component, and exhibiting modified or improved properties, is recovered and in a separate, subsequent operation, the foreign metal on the surface of the component is selectively diffusion coated with one or more elements. These elements effect desired changes in one or more properties of the exposed surface of the foreign metal component.

Diffusion coating elements may comprise one or more of boron, carbon, nitrogen or chromium or mixtures thereof. Foreign metals which can advantageously be used in the invention are those readily forming one or more borides, carbides, nitrides, or chromium compounds with the diffusion coating elements. Such foreign metals may be selected, for example, from chromium, iron, manganese, molybdenum, nickel, niobium, silicon, titanium, tungsten, or vanadium.

The embodiment may be readily understood and exemplified where iron is the foreign metal. Iron can be readily surface-hardened by carburising processes well known to those skilled in the art. For example, the body with an iron interconnected metal constituent can be packed in a bed of granular carbon-bearing material, for example, graphite, and heated. In a preferred embodiment, gas carburising is used wherein the active carburising agent is a hydrocarbon gas such as methane, propane, or butane, or the like. The body is heated for a period of 5 to 30 hours at a temperature of 800°-1000° C. depending on the desired thickness of the carburised layer in an atmosphere comprising one or more of the aforementioned gases. Iron carbide, $Fe_4C_3$, is formed by reaction of the carburising agent with the iron foreign metal substrate at the surface thereof. The iron carbide diffuses at a rate determined by the time and temperature within the aforesaid range into the foreign metal constituent to provide a surface coating of the desired thickness.

An alternative means for surface hardening iron is by a nitriding treatment, well known to those skilled in the art. The active nitriding agent is typically anhydrous ammonia although other reactive nitrogen-containing gases and gas mixtures can be used. The body is heated for a period of 5–80 hours at a temperature typically within the range of 500°-600° C. in an atmosphere comprising the aforesaid nitriding agent. Iron nitride is formed by reaction of the nitriding agent with the foreign metal substrate at the surface thereof. The iron nitride diffuses at a rate determined by the time and temperature within the aforesaid range into the foreign metal. The thickness of the iron nitride surface layer is thereby determined.

Yet a further alternative means for surface hardening is by a carbo-nitriding treatment well known to those skilled in the art wherein both iron carbide and iron nitride are simultaneously formed. For example, the component can be immersed in a molten bath of sodium or potassium cyanide. In a preferred embodiment, gaseous carbo-nitriding is used wherein the active agents comprise a mixture of one or more of the aforesaid carburising gases containing a minor proportion of ammonia. The body is heated for a period of 1 to 5 hours at a temperature within the range of 800°-1000° C. in an atmosphere comprising the aforesaid carbo-nitriding agents. Both iron carbide and iron nitride are formed by reaction of the iron foreign metal constituent of the substrate with the carbo-nitriding agents. The carbides and nitrides so formed diffuse into the exposed metal surfaces of the body. The time and temperature of the exposure to the aforesaid conditions determine the thickness of the surface layer of iron carbide and nitride.

Boron and chromium can be selectively diffusion coated onto the foreign metal constituent by chemical vapor deposition processes as disclosed hereinabove.

What is claimed is:

1. A method for producing a self-supporting ceramic body by oxidation of a parent metal to form a polycrystalline material comprising (1) the oxidation reaction product of said parent metal with an oxidant, and, optionally, (2) one or more non-oxidized constituents of the parent metal, the method comprising: heating said parent metal to a temperature above the melting point of said parent metal but below the melting point of the oxidation reaction product to form a body of molten metal and, at said temperature;
   (a) reacting said body of molten metal with said oxidant to form said oxidation reaction product, optionally with one or more dopant(s) added,
   (b) maintaining at least a portion of said oxidation reaction product in contact with and between said body of molten metal and said oxidant, to draw molten metal through the oxidation reaction product towards the oxidant so that the oxidation reaction product continues to form at the interface between the oxidant and previously formed oxidation reaction product, and, optionally, leaving non-oxidized constituents of said parent metal dispersed through said polycrystalline material,
   (c) recovering said ceramic body, and
   (d) coating at least a portion of at least one surface of said recovered body with one or more materials which effects desired changes to the properties of said recovered body.

2. The method according to claim 1, further comprising providing said coating by at least one process selected from the group consisting of chemical vapor deposition, and physical vapor deposition.

3. The method according to claim 1, wherein said oxidant comprises at least one material selected from the group consisting of oxygen, nitrogen, a halogen, sulphur, phosphorus, arsenic, carbon, boron, selenium, tellurium, methane, ethane, propane, acetylene, ethylene, propylene, an $H_2/H_2O$ mixture and a $CO/CO_2$ mixture.

4. The method according to claim 1, further comprising prior to said coating, displacing at least a portion of said non-oxidized constituents of said parent metal with a foreign metal and wherein said coating comprises exposing at least a portion of said foreign metal to conditions sufficient to diffuse at least one constituent of said coating into said foreign metal.

5. The method according to claim 1, wherein said coating is conducted in a manner sufficient to provide said self-supporting ceramic body with surface properties which differ in at least one aspect from at least a portion of the interior of said recovered body.

6. The method according to claim 1, wherein at least a portion of the surface of said recovered body reacts chemically during said coating.

7. The method according to claim 1, further comprising selectively coating said recovered body.

8. The method according to claim 6, wherein said selectively coating comprises diffusion coating.

* * * * *